(12) United States Patent
Anzai et al.

(10) Patent No.: US 9,154,665 B2
(45) Date of Patent: Oct. 6, 2015

(54) IMAGE PROCESSING APPARATUS AND CONTROL METHOD THEREOF

(71) Applicant: CANON KABUSHIKI KAISHA, Tokyo (JP)

(72) Inventors: Shizuka Anzai, Yokohama (JP); Kohei Murayama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/230,137

(22) Filed: Mar. 31, 2014

(65) Prior Publication Data
US 2014/0300935 A1     Oct. 9, 2014

(30) Foreign Application Priority Data
Apr. 4, 2013    (JP) ................................ 2013-078987

(51) Int. Cl.
| | |
|---|---|
| H04N 1/04 | (2006.01) |
| H04N 1/40 | (2006.01) |
| G09G 5/14 | (2006.01) |
| G06T 7/40 | (2006.01) |

(52) U.S. Cl.
CPC ............ *H04N 1/40062* (2013.01); *G06T 7/408* (2013.01); *G09G 5/14* (2013.01)

(58) Field of Classification Search
CPC ....... H04N 1/40062; G09G 5/14; G06T 7/408
USPC .................. 358/1.17, 474, 505, 497
See application file for complete search history.

(56) References Cited

U.S. PATENT DOCUMENTS 8,390,743 B2 * 3/2013 Cheng et al. .................. 348/716

FOREIGN PATENT DOCUMENTS

| | | |
|---|---|---|
| JP | 2004-048224 A | 2/2004 |
| JP | 2009-044295 A | 2/2009 |

* cited by examiner

*Primary Examiner* — Houshang Safaipour
(74) *Attorney, Agent, or Firm* — Carter, DeLuca, Farrell & Schmidt, LLP (57) ABSTRACT

An image processing apparatus reads an image out of a frame buffer by vertically flipping the image, writes the image into an output line buffer by horizontally flipping the image, divides each line, and simultaneously outputs the resulting line segments. Methods for vertical flipping, horizontal flipping, and simultaneous output are changed according to the output settings.

11 Claims, 11 Drawing Sheets

INPUT IMAGE

FIG. 2B

LEFT IMAGE          RIGHT IMAGE

FIG. 2C

LEFT IMAGE  RIGHT IMAGE

FIG. 2D

LEFT IMAGE  RIGHT IMAGE

FIG. 2E

OUTPUT IMAGE  OUTPUT SCANNING

IMAGE PROCESSING APPARATUS AND CONTROL METHOD THEREOF

BACKGROUND OF THE INVENTION

1. Field of the Invention

The present invention relates to an image processing apparatus adapted to display images on a screen divided into a plurality of regions as well as to a control method thereof.

2. Description of the Related Art

There is a system which processes a plurality of image segments, obtained by dividing a single image, on a plurality of video processing apparatuses and outputs the processed image segments to a display panel in multiple types of scanning directions. Japanese Patent Laid-Open No. 2004-048224 (hereinafter, Patent Document 1) discloses an output scanning method for dividing an output image vertically into two segments or vertically and horizontally into four segments in relation to video signal conversion. In this example, all image segments are output via sequential scanning in a horizontal direction (cross-split simultaneous rightward scanning). Japanese Patent Laid-Open No. 2009-044295 (hereinafter, Patent Document 2) discloses an output scanning method for dividing a 4K2K-resolution display panel into four sections in relation to a liquid crystal projector. In this example, all the image segments are scanned sequentially from the center of the screen outward and four screens are output simultaneously (cross-split simultaneous outward scanning).

However, in order to support the two output scanning modes, the cross-split simultaneous rightward scanning and the cross-split simultaneous outward scanning, a frame buffer is needed for scan conversion of output images. Also, in order to support simultaneous output of regions, there is a need for as many output circuits as there are output images. This increases a circuit scale. Furthermore, the output methods described in Patent Documents 1 and 2 cited above cannot support a method which divides an output image horizontally and produces simultaneous outputs via sequential horizontal scanning (horizontal-split simultaneous rightward scanning).

SUMMARY OF THE INVENTION

An embodiment of the present invention enables various modes of output scanning by curbing increases in circuit scale.

According to one aspect of the present invention, there is provided an image processing apparatus which supplies an image to a display apparatus configured to create a display in an output scanning mode in which drawing scans are performed in parallel in a plurality of subregions making up one screen, the apparatus comprising a plurality of video processing units configured to divide the image into a plurality of partial images and process the partial images in parallel, wherein each of the plurality of video processing units includes: a frame buffer configured to hold the partial images; a line buffer configured to hold line data; a reading unit configured to read the line data of the partial images from the frame buffer in line order corresponding to the output scanning mode; a writing unit configured to write line data which is based on the line data read by the reading unit into the line buffer in pixel order corresponding to the output scanning mode; and an output unit configured to divide the line data held by the line buffer into a plurality of items of line data and output the items of line data in parallel during one scanning interval of the output scanning mode.

Also, according to another aspect of the present invention, there is provided a control method for an image processing apparatus which supplies an image to a display apparatus configured to create a display in an output scanning mode in which drawing scans are performed in parallel in a plurality of subregions making up one screen, the control method comprising an input step of providing inputs to a plurality of video processing units configured to divide the image into a plurality of partial images and process the partial images in parallel, the control method further comprising, for each of the plurality of video processing units: a reading step of reading line data of the partial images in line order corresponding to the output scanning mode out of a frame buffer configured to hold the partial images; a writing step of writing line data which is based on the line data read by the reading step into a line buffer in pixel order corresponding to the output scanning mode; and an output step of dividing the line data held by the line buffer into a plurality of items of line data and outputting the items of line data in parallel during one scanning interval of the output scanning mode.

Further features of the present invention will become apparent from the following description of exemplary embodiments with reference to the attached drawings.

DESCRIPTION OF THE EMBODIMENTS

An exemplary embodiment of the present invention will be described below with reference to the accompanying drawings.

Figure 1:
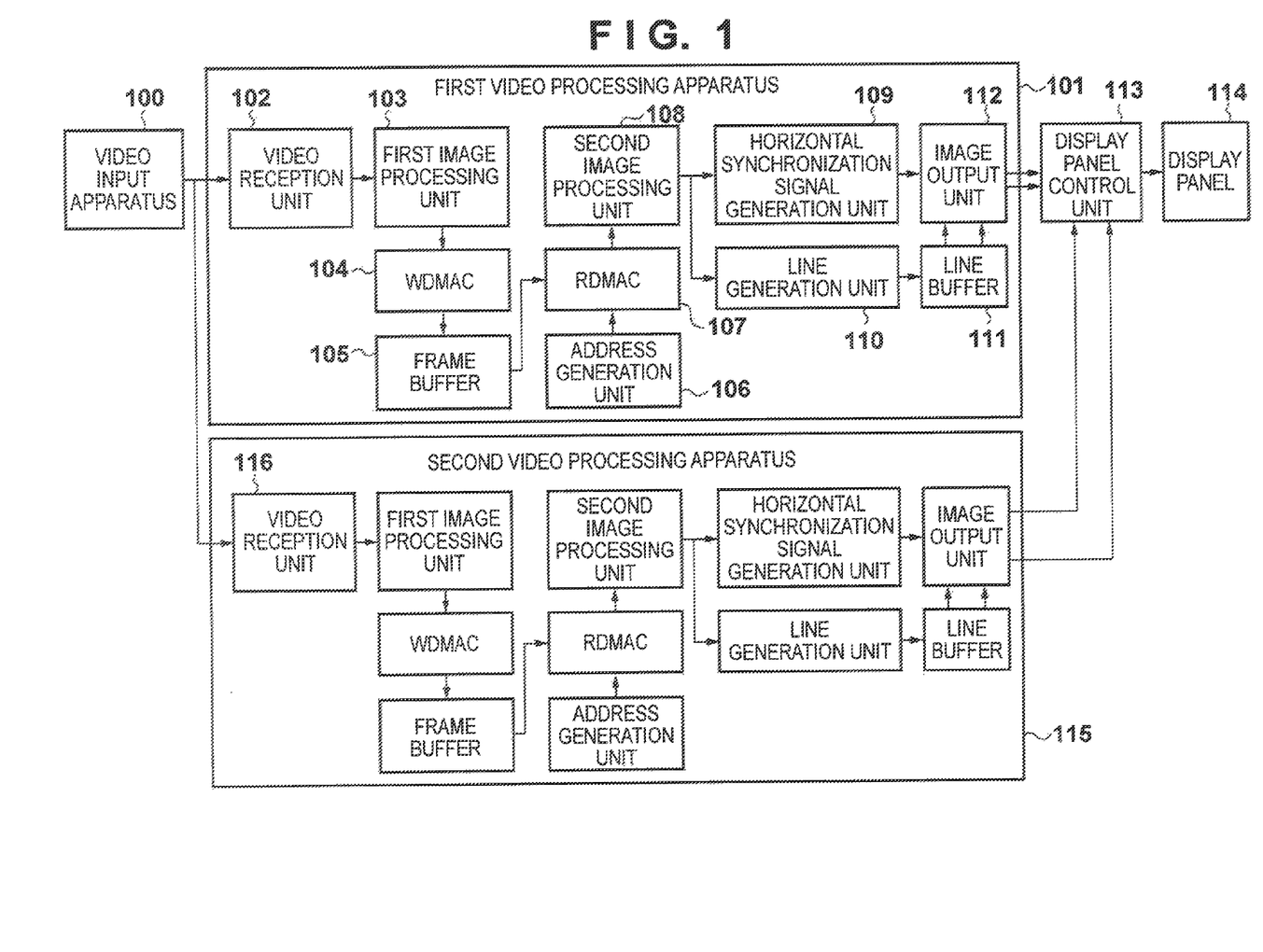
FIG. 1 is a block diagram of a video display apparatus according to an embodiment.

FIG. 1 is a block diagram showing a configuration example of a video display apparatus according to an embodiment. In the present embodiment, a video display apparatus such as shown in FIG. 1 will be described as an example of an image processing apparatus configured to supply images to a display panel 114 serving as a display apparatus which creates a display in an output scanning mode in which drawing scans are performed concurrently in a plurality of subregions making up a single image. The video display apparatus includes a first video processing apparatus 101 and a second video processing apparatus 115 as a plurality of video processing units configured to divide an image into a plurality of partial images and concurrently process the partial images. The video input apparatus 100 transmits images which are input to the video display apparatus. The first video processing apparatus 101 and the second video processing apparatus 115 receive an input image divided horizontally into two segments (left and right) and concurrently process and output the respective segments. The display panel control unit 113 combines output images of the first video processing apparatus 101 and the second video processing apparatus 115 into one screen, and displays the screen on the display panel 114. In the present embodiment, it is assumed that as executable output scanning modes, the display panel 114 has three modes (cross-split simultaneous outward scanning, cross-split simultaneous rightward scanning, and horizontal-split simultaneous rightward scanning) described later with reference to FIGS. 7A to 7C.

Output settings of the video display apparatus are determined according to the output scanning mode of the display panel 114. Now, the output settings of the video display apparatus will be described. The output settings of the video display apparatus according to the present embodiment correspond to cross-split simultaneous outward scanning, cross-split simultaneous rightward scanning, and horizontal-split simultaneous rightward scanning and a user can specify a desired output mode via a console unit (not shown). Note that an output scanning mode executed by the display panel 114 may be acquired from display panel 114 through communications and may be used as an output setting.

Figure 7A:
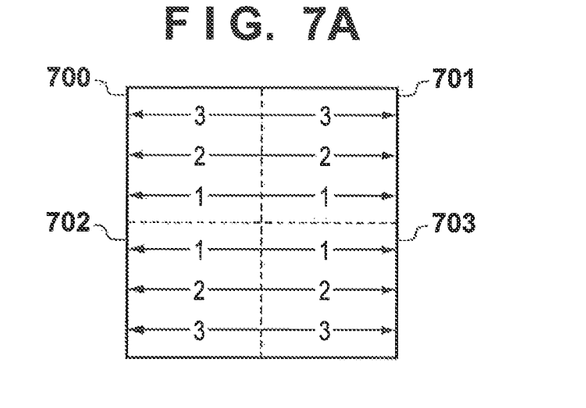
FIGS. 7A to 7C are diagrams showing output scanning according to the embodiment.

FIG. 7A is a diagram showing cross-split simultaneous outward scanning. The arrows in FIG. 7A indicate scanning directions of regions to be output to the display panel. The numbers attached to the arrows indicate scanning order. In the case of cross-split simultaneous outward scanning, an output region is divided vertically and horizontally into four parts (subregions 700, 701, 702, and 703) as indicated by dashed lines in FIG. 7A, and scanning is done sequentially from the center of a full screen toward an outer edge in a horizontal direction in each subregion. All the subregions are output (scanned) simultaneously. In the upper left subregion 700 of the four subregions, a main scanning direction is from right to left while a sub-scanning direction is from bottom to top. In the upper right subregion 701, the main scanning direction is from left to right and the sub-scanning direction is from bottom to top. In the lower left subregion 702, the main scanning direction is from right to left and the sub-scanning direction is from top to bottom. In the lower right subregion 703, the main scanning direction is from left to right and the sub-scanning direction is from top to bottom.

Figure 7B:
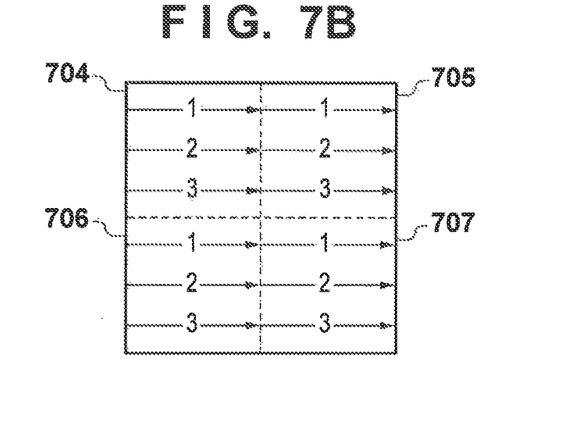

FIG. 7B is a diagram showing cross-split simultaneous rightward scanning. In the case of cross-split simultaneous rightward scanning, an output region is divided vertically and horizontally (subregions 704, 705, 706, and 707) as indicated by dashed lines in FIG. 7B, and horizontal scanning is done sequentially from top to bottom in each subregion. All the subregions are output (scanned) simultaneously. In all the subregions, the main scanning direction is from left to right and the sub-scanning direction is from top to bottom.

Figure 7C:
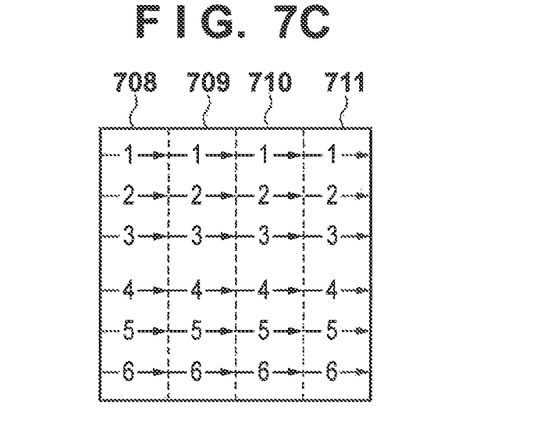

FIG. 7C is a diagram showing horizontal-split simultaneous rightward scanning. In the case of horizontal-split simultaneous rightward scanning, an output region is divided horizontally (subregions 708, 709, 710, and 711) as indicated by dashed lines in FIG. 7C, and horizontal scanning is done sequentially from top to bottom in each subregion. All the subregions are output (scanned) simultaneously. In all the subregions, the main scanning direction is from left to right and the sub-scanning direction is from top to bottom.

Referring back to FIG. 1, a configuration and a data flow of the video processing apparatus according to the embodiment will be described. A video reception unit 102 of the first video processing apparatus 101 receives a partial image (left image), which is a left half of the input image. A video reception unit 116 of the second video processing apparatus 115 receives a partial image (right image), which is a right half of the input image. The first video processing apparatus 101 and the second video processing apparatus 115 differ in that they process the left image and the right image, respectively, but are similar in configuration, and thus the configuration and operation of the first video processing apparatus 101 will be described below. Note that the video reception units 102 and 116 may be configured to receive a full image and output the left image and the right image, respectively, to a first image processing unit 103.

The first image processing unit 103 applies processes such as noise reduction, IP conversion, and keystone correction to the left image supplied from the video reception unit 102. The processed image data is written into a frame buffer 105 by a write DMA controller (WDMAC 104). A read DMA controller (RDMAC 107) reads data out of the frame buffer 105 according to an address generated by an address generation unit 106, and transmits the data to a second image processing unit 108. The address generation unit 106 changes an address generation method based on specified output settings (output scanning mode), and reads lines of the partial image held in the frame buffer in line order corresponding to the output scanning mode of the display panel 114. The output settings may be designed to be specified, for example, by a register or the like. The second image processing unit 108 performs processes such as edge enhancement, luminance irregularity correction, and color irregularity correction.

A line generation unit 110 writes pixel data which is output from the second image processing unit 108 into a line buffer 111. The line generation unit 110 specifies the output settings via a register or the like and changes a method of writing into the line buffer 111 based on the specified output settings. That is, the line generation unit 110 writes line data into the line buffer 111 in pixel order corresponding to the output scanning mode of the display panel 114, where the line data is based on the line data read out by the RDMAC 107. A horizontal synchronization signal generation unit 109 generates a horizontal synchronization signal for the pixel data which is output from the second image processing unit 108 and transmits the horizontal synchronization signal to the image output unit 112. The horizontal synchronization signal generation unit 109 changes a generation method for the horizontal synchronization signal based on the specified output settings. The output settings may be designed to be specified, for example, by a register or the like. The image output unit 112 reads line data out of the line buffer 111 and outputs the line data to the display panel control unit 113.

Figure 9:
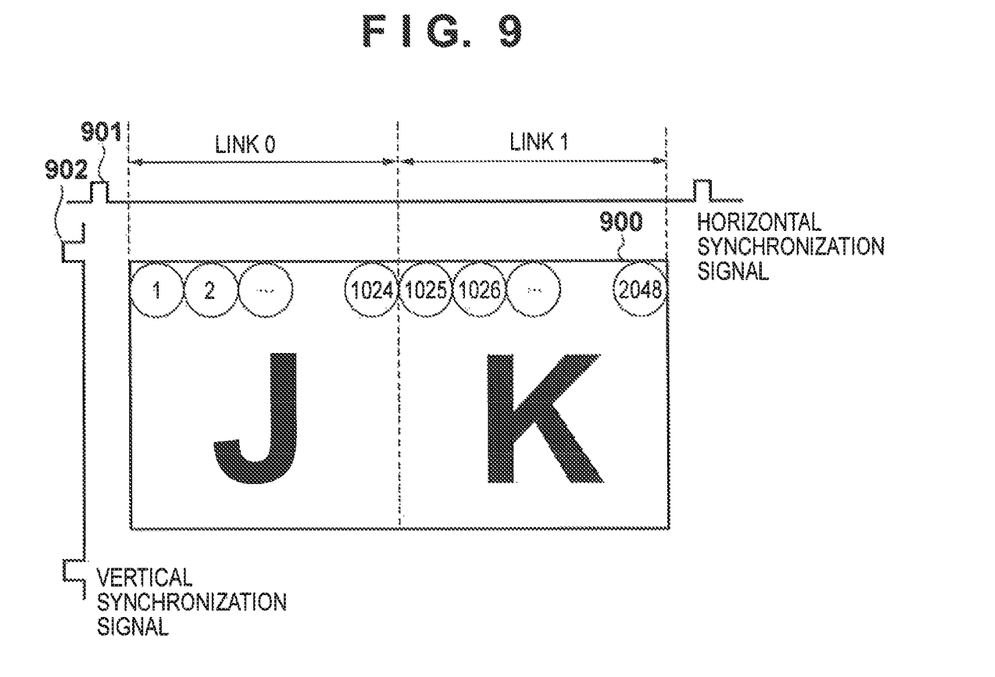
FIG. 9 is a diagram showing an output method of a video output unit.

The image output unit 112 achieves simultaneous output of pixels using a dual-link mode. In the dual-link mode, two ports are assigned in order to output pixel data from the line buffer 111, and data of one line is output simultaneously through the two ports. An example of output in dual-link mode is shown in FIG. 9. An image 900 contains 2,048 pixels per line. A signal 901 and a signal 902 are a horizontal synchronization signal and a vertical synchronizing signal, respectively, of the image 900, and are input to the image output unit 112. In the dual-link mode, one line is divided into two parts and pixels beginning with pixel [1] and ending with pixel [1024] are assigned to link 0. Similarly, pixels beginning with pixel [1025] and ending with pixel [2048] are assigned to link 1. Therefore, at the start output in dual-link mode, pixel [1] and pixel [1025] are output simultaneously. Pixel [2] and pixel [1026] are similarly output simultaneously, and so are subsequent pairs of pixels. The image output unit 112 makes output settings using registers or the like, and a link mode as well as locations of the starting pixel and the ending pixel assigned to the links are changed based on the output settings.

Figure 8:
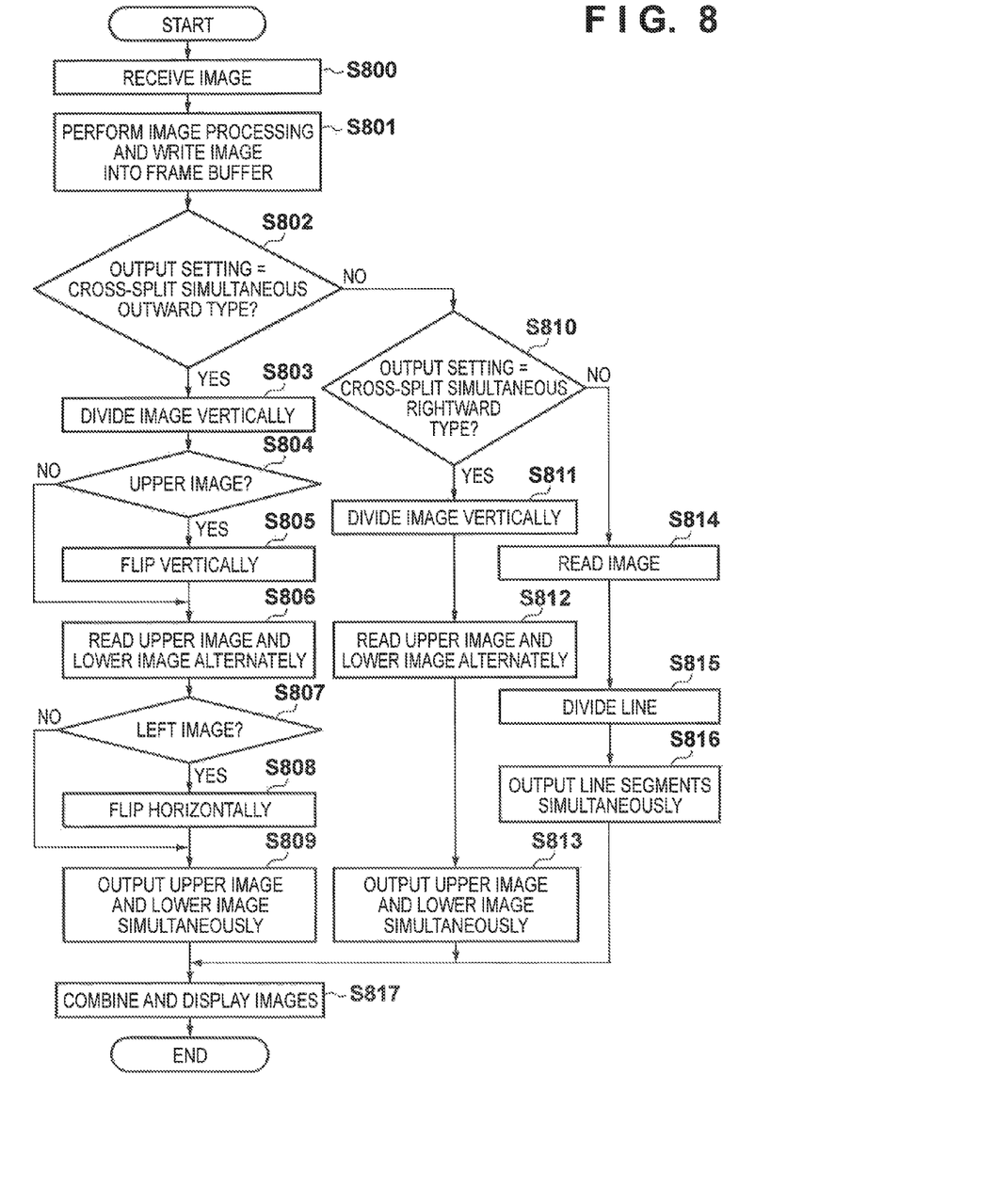
FIG. 8 is a flowchart of a video display apparatus according to the embodiment.

Next, operation of the video display apparatus will be described. FIG. 8 is an operation flowchart of the video display apparatus according to the embodiment. (Operation of the image processing unit and the like are omitted.) First, the video reception unit 102 of the first video processing apparatus 101 receives the left image of the input image and the video reception unit 116 of the second video processing apparatus 115 receives the right image (S800).

Figure 2A:
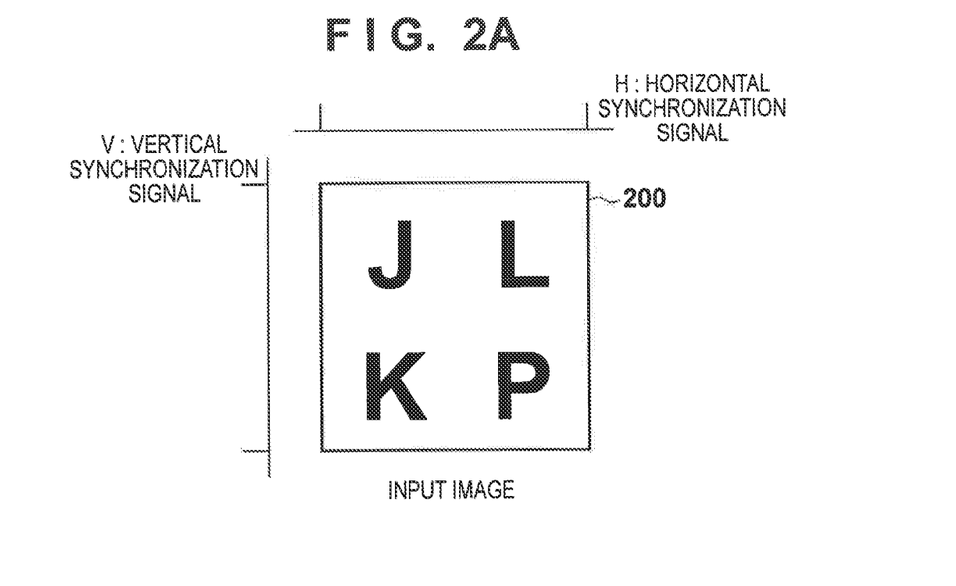
FIGS. 2A to 2E are diagrams showing a scan conversion method for cross-split simultaneous outward scanning output according to the embodiment.
Figure 2B:
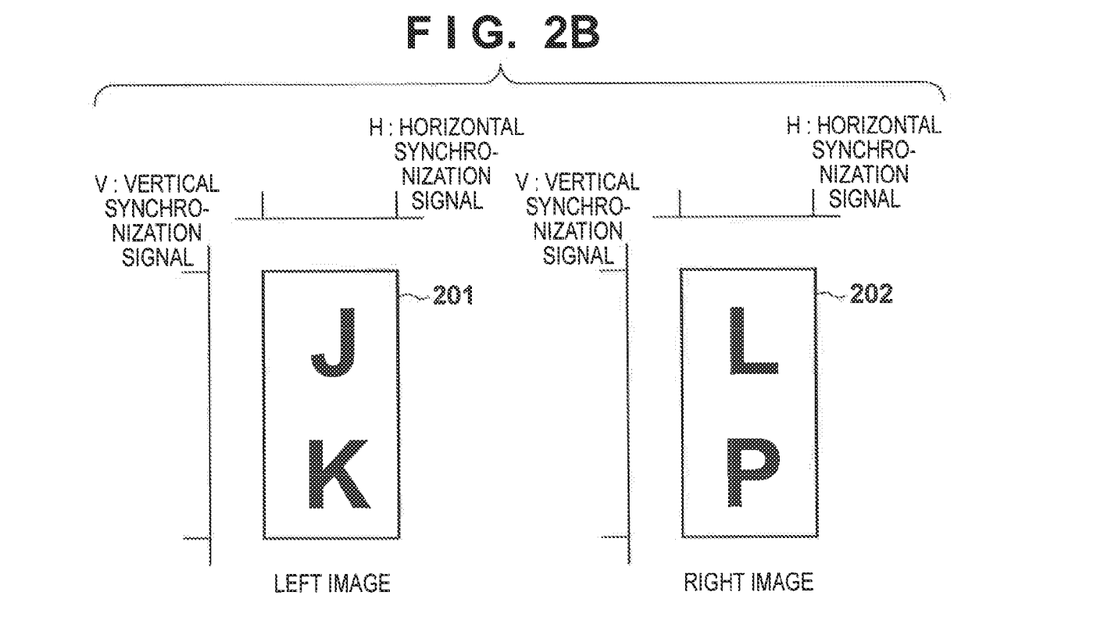

The first image processing unit 103 performs image processing, and then the WDMAC 104 writes the image into the frame buffer 105 (S801). FIG. 2A is an input image 200 accepted as input from the video input apparatus 100. FIG. 2B shows a left image 201 and a right image 202 obtained by horizontally dividing the input image 200, where the left image 201 is processed by the first video processing apparatus 101 and the right image 202 is processed by the second video processing apparatus 115. A right-left dividing line of the image is brought into coincidence with a right-left dividing line used to determine subregions of the display panel 114. Also, in dividing the input image 200, peripheral pixels on edges of each subregion may be added to adjoining subregions such that the subregions will overlap each other. The video reception units 102 and 116 insert the horizontal synchronization signal in half periods to suit the image segments. The frame data on each of the right and left images is written into the frame buffer 105 as shown in FIG. 2B. The above process is common to different output settings. Consequently, subsequent processes are changed according to the output settings of the video display apparatus.

<When Cross-Split Simultaneous Outward Scanning is Specified as Output Setting>

First, description will be given of processes performed when cross-split simultaneous outward scanning is specified as an output setting (YES in S802). The RDMAC 107 vertically divides the image in the frame buffer 105 (S803) and reads line data (S806) by vertically flipping an upper-half image (upper image) (YES in S804; S805) and without vertically flipping a lower-half image (lower image) (NO in S804). When an image is read out of the frame buffer 105, lines are read alternately from the upper image and the lower image (S806). The right and left images read out in this way are shown as a left image 203 and a right image 204 in FIG. 2C.

Figure 5A:
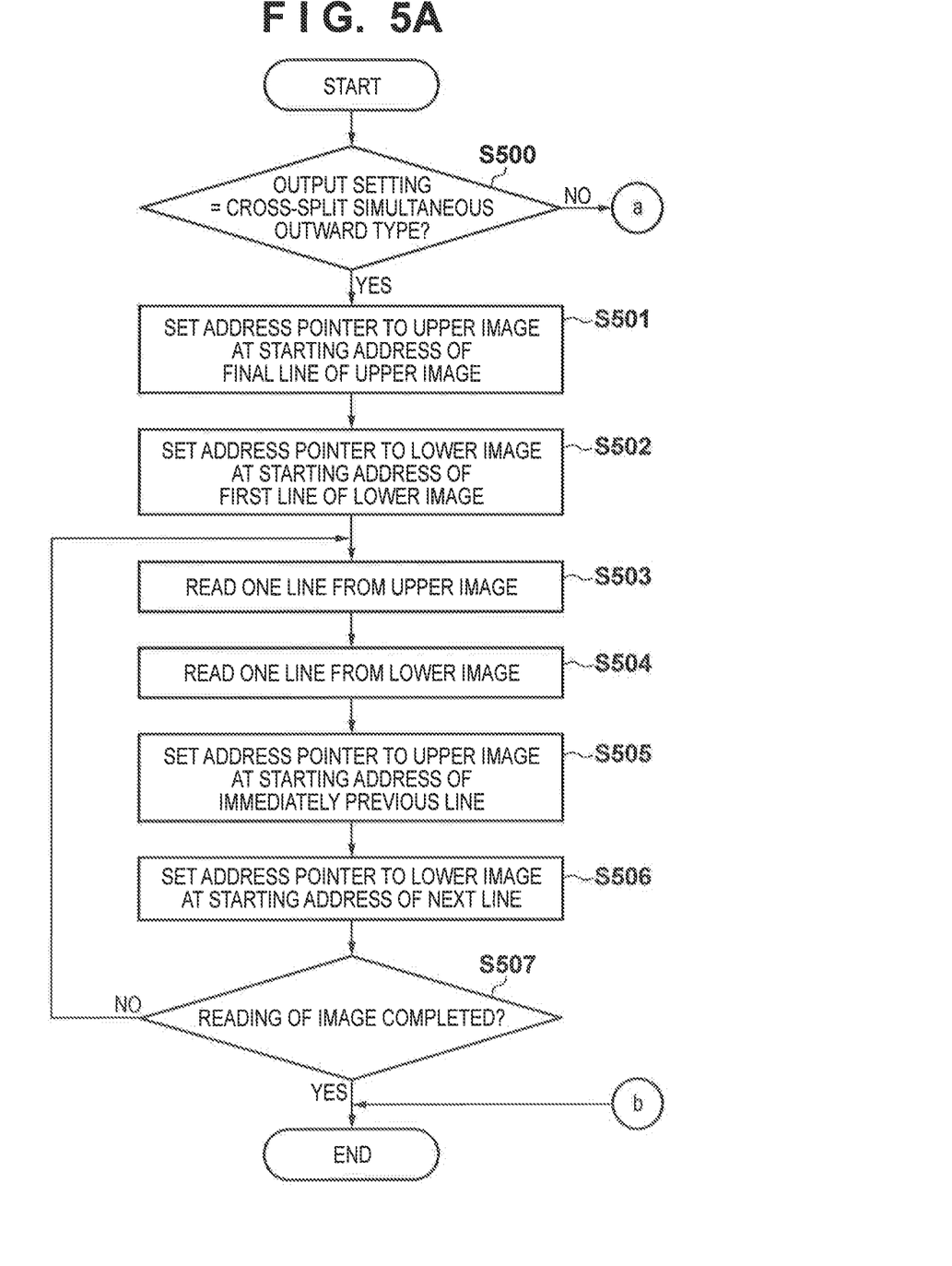
FIGS. 5A and 5B are flowcharts of an image reading method according to the embodiment.

An image reading process performed by the RDMAC 107 and the address generation unit 106 will be described in detail with reference to a flowchart of FIG. 5A. When the cross-split simultaneous outward type is specified as an output setting (YES in S500), the address generation unit 106 generates two read address pointers for the upper image and the lower image. First, the address generation unit 106 sets a read address pointer to the upper image at a starting address of a final line of the upper image (S501). Also, the address generation unit 106 sets a read address pointer to the lower image at a starting address of a first line of the lower image (S502).

The line set in the pointer is brought into coincidence with the dividing line which is output to the display panel in cross-split simultaneous outward scanning. That is, with the first video processing apparatus 101, arrow 1 in the subregion 700 of FIG. 7A is the line set in S501 and arrow 1 in the subregion 702 of FIG. 7A is the line set in S502. Also, with the second video processing apparatus 115, arrow 1 in the subregion 701 of FIG. 7A is the line set in S501 and arrow 1 in the subregion 703 of FIG. 7A is the line set in S502.

The RDMAC 107 reads one line from the upper image by referring to the read address pointer to the upper image (S503) and then reads one line from the lower image by referring to the read address pointer to the lower image (S504). When the lines of the upper image and the lower image have been read out, the address generation unit 106 sets the read address pointer to the upper image at the starting address of the immediately previous line (S505), and sets the address pointer to the lower image at the starting address of the next line (S506). That is, with the first video processing apparatus 101, arrow 2 in the subregion 700 of FIG. 7A is the line set in S505 and arrow 2 in the subregion 702 of FIG. 7A is the line set in S506. With the second video processing apparatus 115, arrow 2 in the subregion 701 of FIG. 7A is the line set in S505 and arrow 2 in the subregion 703 of FIG. 7A is the line set in S506. In this way, the RDMAC 107 continues reading lines alternately from the upper image and the lower image until the entire image is completely read out (S507 and S503 to S506).

Referring back to FIG. 8, the line generation unit 110 stores the read line data of the upper image and the lower image in the line buffer 111, by horizontally flipping the line data of the left image in so doing (S807 and S808). In the present embodiment, since the first video processing apparatus 101 processes the left image, horizontal flipping is done by the line generation unit 110 of the first video processing apparatus 101 (YES in S807; S809). On the other hand, horizontal flipping is not done by the line generation unit 110 of the second video processing apparatus 115 (NO in S807). The image output unit 112 outputs the line data held in the line buffer 111, based on a horizontal synchronization signal period transmitted from the horizontal synchronization signal generation unit 109 (S809).

Figure 2C:
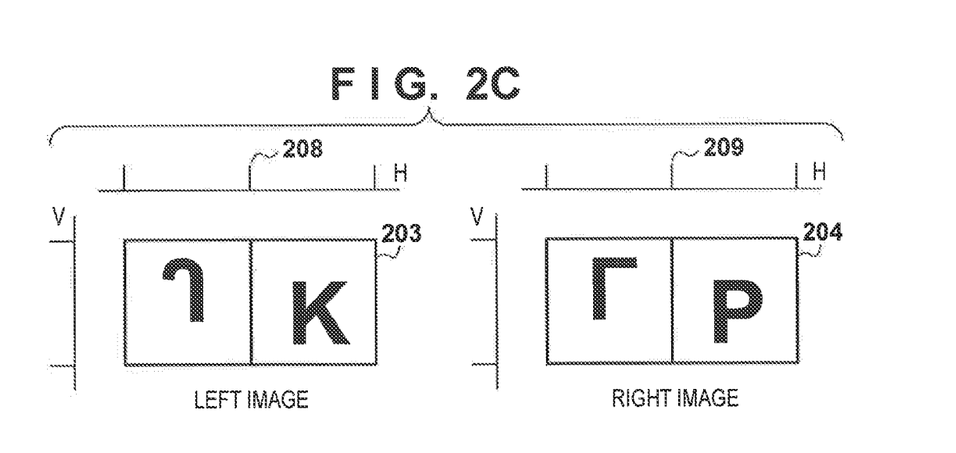
Figure 2D:
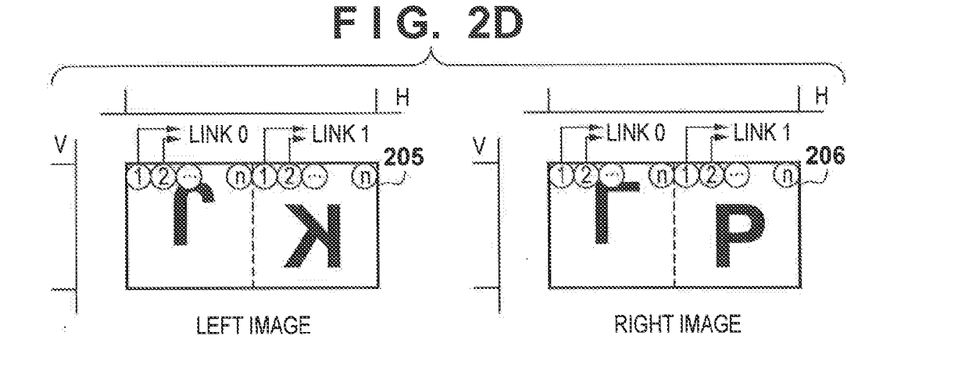
Figure 6:
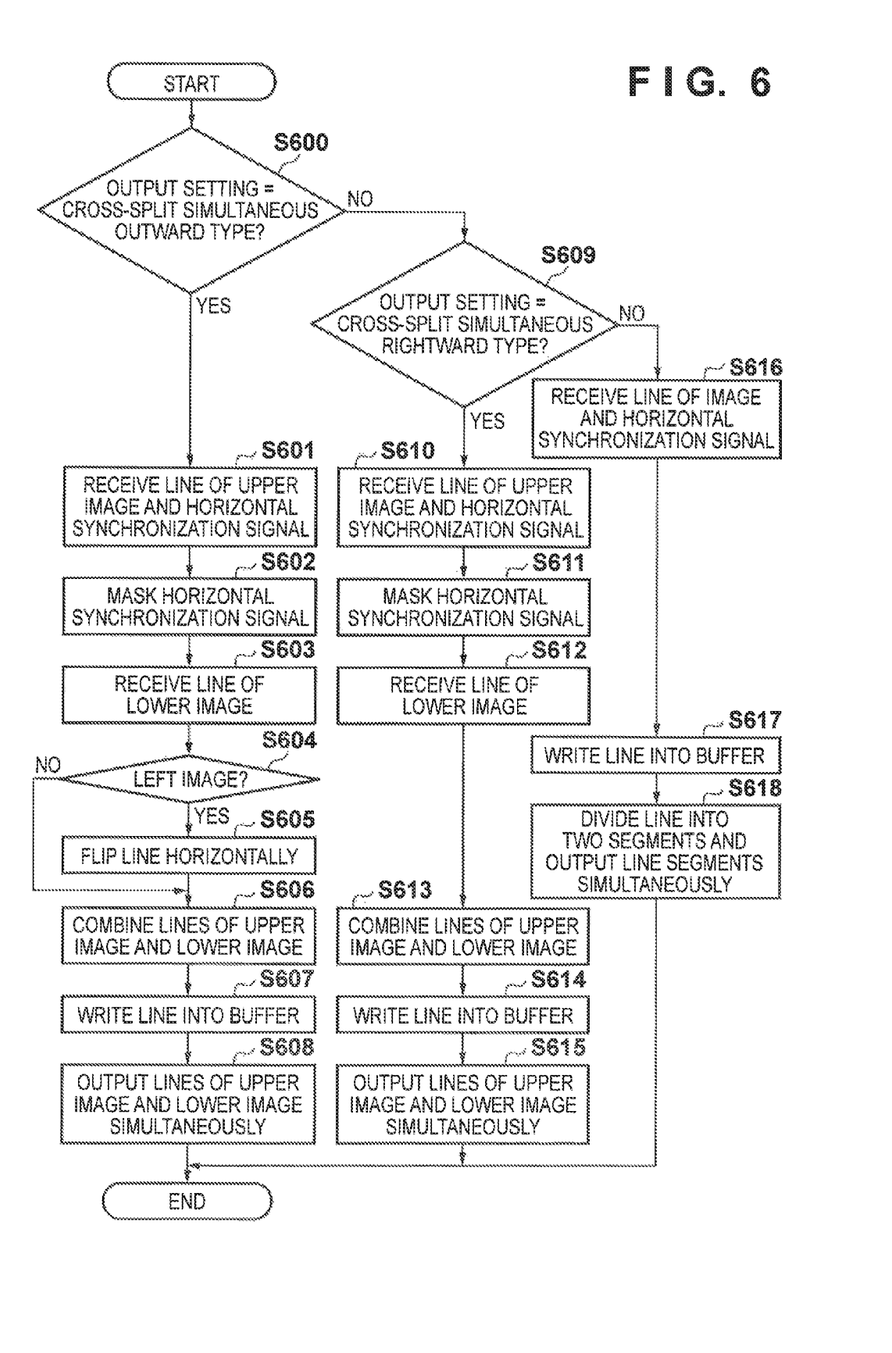
FIG. 6 is a flowchart of an image output method according to the embodiment.

An image output process performed by the line generation unit 110, the horizontal synchronization signal generation unit 109, and the image output unit 112 will be described with reference to a flowchart of FIG. 6. When the cross-split simultaneous outward type is specified as an output setting (YES in S600), the line generation unit 110 receives a line of the upper image and the horizontal synchronization signal generation unit 109 receives the horizontal synchronization signal for the line (S601). The horizontal synchronization signal generation unit 109 masks the horizontal synchronization signal between an active signal period of the upper image and an active signal period of the lower image (S602). As a result, horizontal synchronization signals 208 and 209 of FIG. 2C are masked, and at the time of output, a horizontal synchronization signal is generated such that the line in the upper image and the line in the lower image will coincide in horizontal synchronization signal period as shown in FIG. 2D.

The line generation unit 110 receives the line of the lower image (S603). When the left image is received, the line generation unit 110 horizontally flips the lines of the received upper image and lower image (S604 and S605). In the present embodiment, the line generation unit 110 of the first video processing apparatus 101 horizontally flips lines while the line generation unit 110 of the second video processing apparatus 115 does not flip lines. The image output unit 112 couples two lines of the upper image and the lower image, which are output from the line generation unit 110, to form a single item of line data and writes the line data into the line buffer 111 (S606 and S607).

By outputting line data of the line buffer 111 in dual-link mode, the image output unit 112 outputs lines of the upper image and the lower image during one scanning interval of the display panel 114 (S608). In the first video processing apparatus 101, the image output unit 112 sets the starting and ending pixels on link 0 at the starting and ending pixels of the line after horizontal flipping of an image of "J." Also, the image output unit 112 sets the starting and ending pixels on link 1 at the starting and ending pixels of the line after horizontal flipping of an image of "K." The right and left images at the time of output are shown in FIG. 2D. The images in 205, which are left images, result from horizontally flipping the upper image and lower image in 203, respectively. On the other hand, the images in 206, which are right images, are identical to those in 204. The circles and numbers in FIGS. 2D and 2C represent pixels and their output order. The pixels in the image of "J" and pixels in the image of "K" are output simultaneously, through link 0 and link 1, respectively.

Figure 2E:
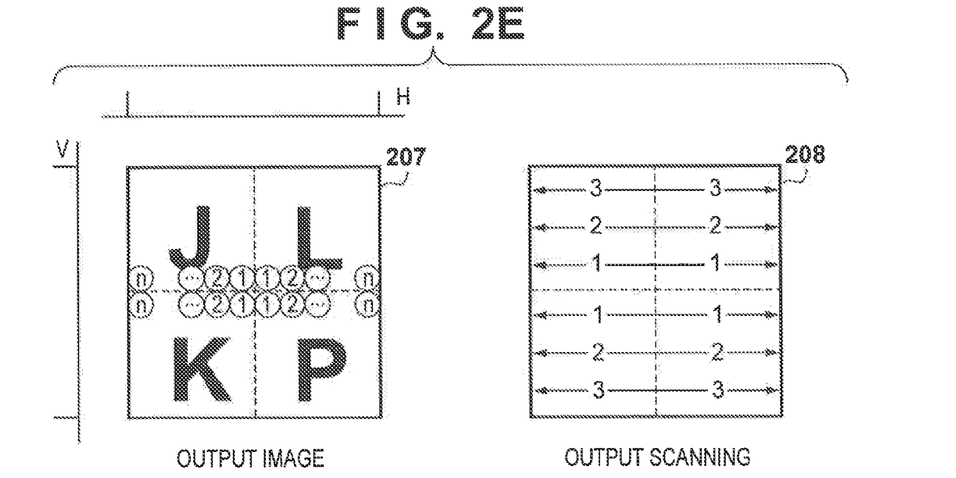

The pixel data output from the image output unit 112 is combined by the display panel control unit 113 with the pixels from the other video processing apparatus and is output to the display panel 114 (S817). The images which are output to the display panel are shown in FIG. 2E. The right and left image segments are combined and displayed as an image 207. The output scanning used at this time is cross-split simultaneous outward scanning as shown in 208.

<When Cross-Split Simultaneous Rightward Scanning is Specified as Output Setting>

Figure 3A:
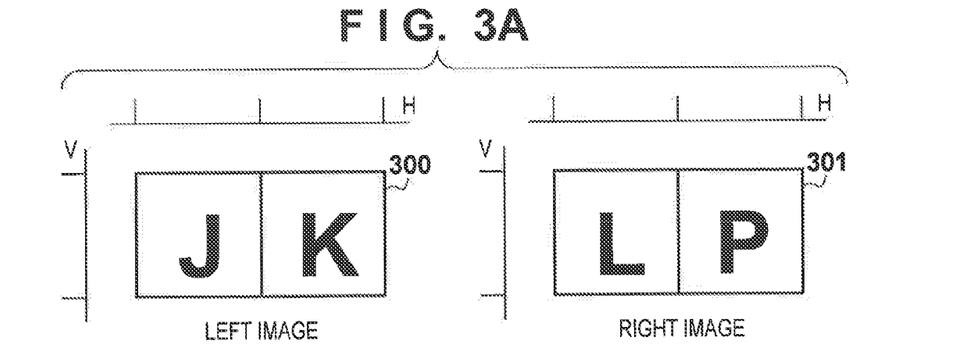
FIGS. 3A to 3C are diagrams showing a scan conversion method for cross-split simultaneous rightward scanning output according to the embodiment.

Next, description will be given of processes performed when cross-split simultaneous rightward scanning is specified as an output setting. In the case of cross-split simultaneous rightward scanning (NO in S802; YES in S810), the RDMAC 107 vertically divides the image in the frame buffer 105 (S811) and reads line data out of the frame buffer 105 without vertically flipping the images (S812). When reading line data out of the line buffer 111, the RDMAC 107 reads lines alternately from the upper image and lower image (S812). The right and left images read out in this way are shown in 300 and 301 of FIG. 3A.

Figure 5B:
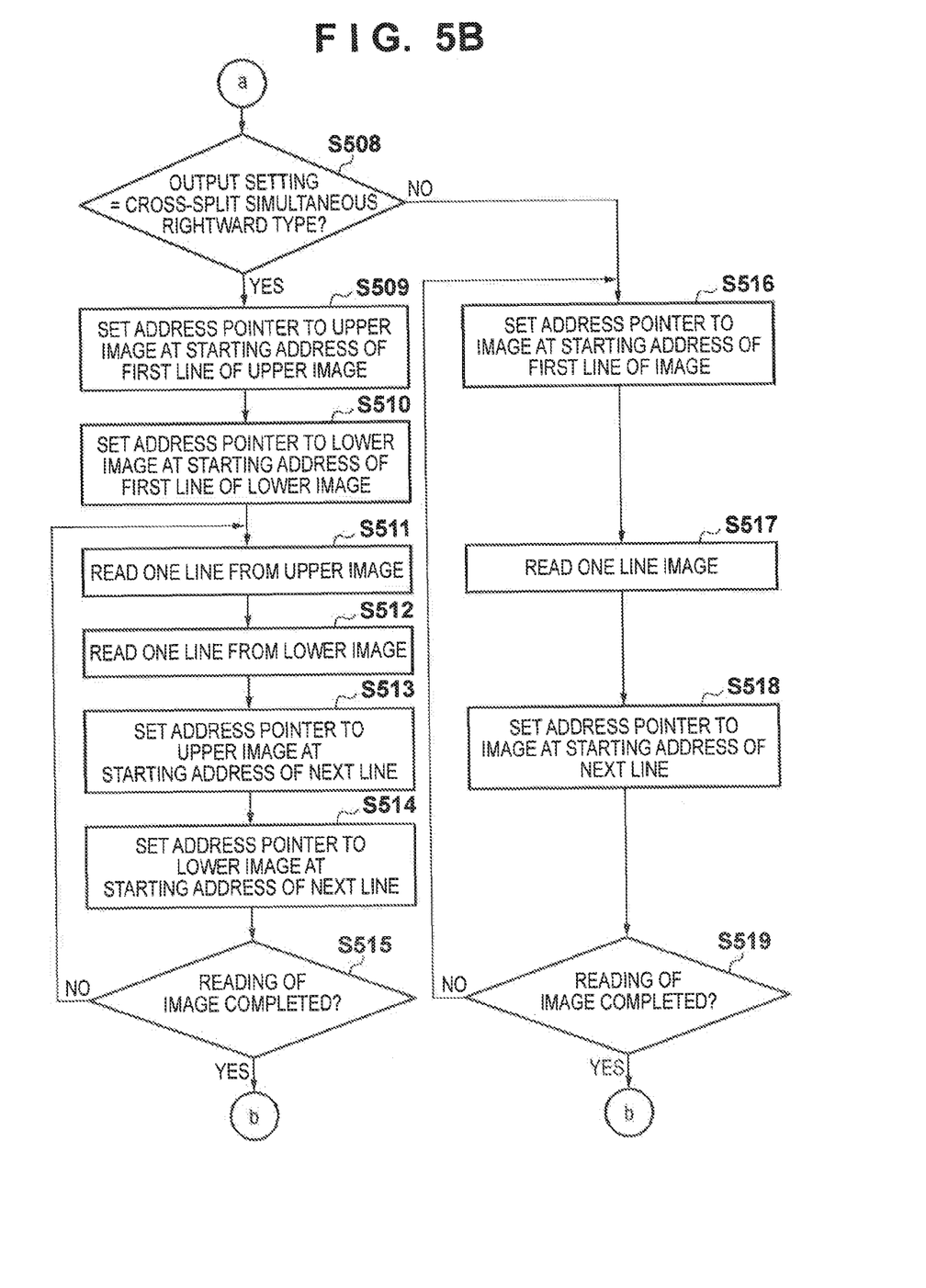

An image reading process performed by the RDMAC 107 and the address generation unit 106 in the case where the cross-split simultaneous rightward type is specified as an output setting will be described in detail with reference to the flowchart of FIGS. 5A and 5B. When the cross-split simultaneous rightward type is specified as an output setting (NO in S500; YES in S508), the address generation unit 106 generates two read address pointers for the upper image and the lower image. The read address pointer to the upper image is set at a starting address of a first line of the upper image (S509) and the read address pointer to the lower image is set at the starting address of the first line of the lower image (S510).

The first line set in the pointer is brought into coincidence with the dividing line which is output to the display panel 114 in cross-split simultaneous rightward scanning. That is, with the first video processing apparatus 101, arrow 1 in the subregion 704 of FIG. 7B is the line set in S509 and arrow 1 in the subregion 706 is the line set in S510. With the second video processing apparatus 115, arrow 1 in the subregion 705 of FIG. 7B is the line set in S509 and arrow 1 in the subregion 707 is the line set in S510.

The RDMAC 107 reads line data of one line from the upper image by referring to the read address pointer to the upper image (S511) and then reads line data of one line from the lower image by referring to the read address pointer to the lower image (S512). When the line data of the upper image and the lower image has been read out, the address generation unit 106 sets the read address pointer to the upper image at the starting address of the next line (S513) and sets the read address pointer to the lower image at the starting address of the next line (S514).

That is, with the first video processing apparatus 101, arrow 2 in the subregion 704 of FIG. 7B is the line set in S513 and arrow 2 in the subregion 706 of FIG. 7B is the line set in S514. With the second video processing apparatus 115, arrow 2 in the subregion 705 of FIG. 7B is the line set in S513 and arrow 2 in the subregion 707 of FIG. 7B is the line set in S514. In this way, the RDMAC 107 continues reading lines alternately from the upper image and the lower image until the entire image is completely read out (S515 and S511 to S514).

Referring back to FIG. 8, next, the image output unit 112 outputs the line data based on a horizontal synchronization signal period transmitted from the horizontal synchronization signal generation unit 109 (S813). An image output process performed by the line generation unit 110, the horizontal synchronization signal generation unit 109, and the image output unit 112 will be described with reference to the flowchart of FIG. 6.

When the cross-split simultaneous rightward type is specified as an output setting (NO in S600; YES in S609), the line generation unit 110 receives a line of the upper image and the horizontal synchronization signal generation unit 109 receives the horizontal synchronization signal for the line (S610). When the cross-split simultaneous rightward type is specified as an output setting, as in the case of the cross-split simultaneous outward type described above, the horizontal synchronization signal generation unit 109 masks the horizontal synchronization signal between the line of the upper image and the line of the lower image (S611). The line generation unit 110 receives the line data of the lower image (S612), couples the lines of upper image and lower image to form one line without horizontal flipping (S613), and writes the resulting line into the line buffer 111 (S614). The image output unit 112 outputs the line data from the line buffer 111 in dual-link mode (S615). Consequently, line data of the upper image and lower image are output in parallel during one scanning interval of the display panel 114.

Figure 3B:
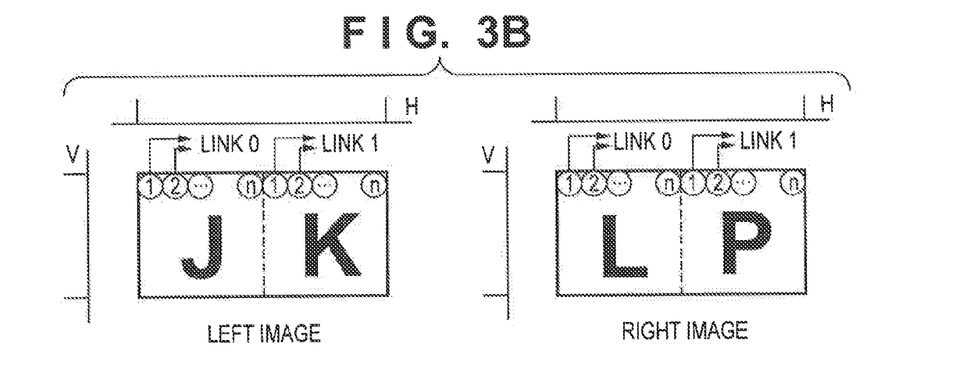

The image output unit 112 sets the starting and ending pixels on link 0 at the starting and ending pixels of the line in the image of "J." The image output unit sets the starting and ending pixels on link 1 at the starting and ending pixels of the line in the image of "K." The left and right images at the time of output are shown in FIG. 3B. The circles and numbers in FIG. 3B represent pixels and their output order. The pixels in the image of "J" and pixels in the image of "K" are output simultaneously, through link 0 and link 1, respectively.

Figure 3C:
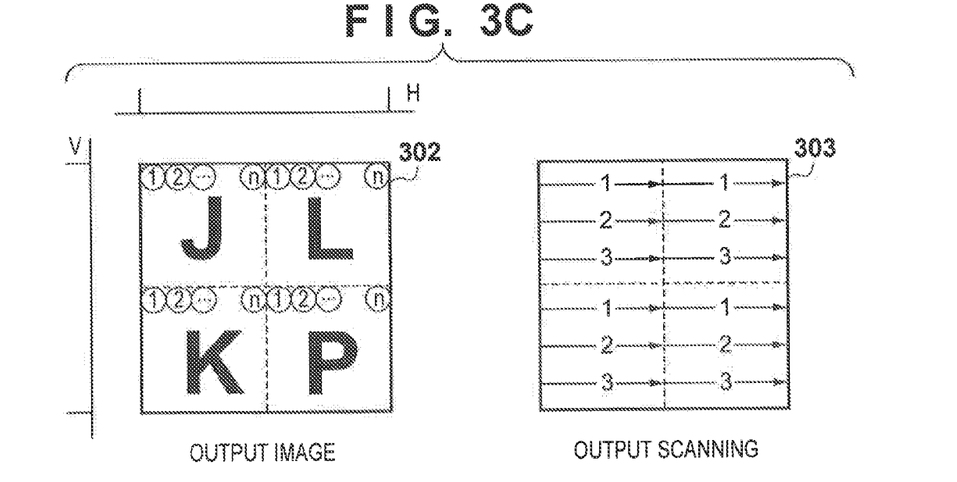

The pixel data output from the image output unit 112 is combined by the display panel control unit 113 with the pixels from the other video processing apparatus and is output to the display panel 114 (S817). The image which is output to the display panel is shown in FIG. 3C. The right and left image segments are combined and displayed as an image 302. The output scanning used at this time is cross-split simultaneous rightward scanning as shown in 303.

<When Horizontal-Split Simultaneous Rightward Scanning is Specified as Output Setting>

Figure 4A:
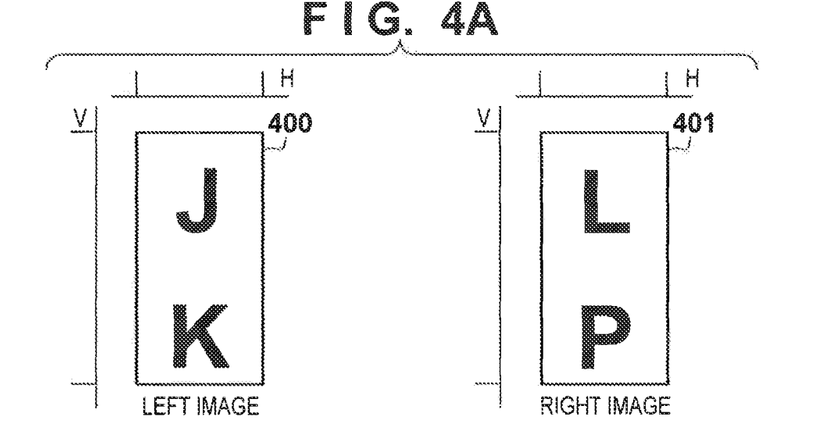
FIGS. 4A to 4C are diagrams showing a scan conversion method for horizontal-split simultaneous rightward scanning output according to the embodiment.

Description will be given of processes performed when the horizontal-split simultaneous rightward type is specified as an output setting. In the present embodiment, neither cross-split simultaneous outward scanning nor cross-split simultaneous rightward scanning, but horizontal-split simultaneous rightward scanning is specified as an output setting (NO in S802; NO in S810). In the case of horizontal-split simultaneous rightward scanning, the RDMAC 107 reads lines continuously from top to bottom without horizontally dividing the image in the frame buffer 105 (S814). The right and left images read out in this way are shown in 400 and 401 of FIG. 4A.

An image reading process performed by the RDMAC 107 and the address generation unit 106 in the case of the horizontal-split simultaneous rightward type will be described with reference to the flowcharts of FIGS. 5A and 5B. When the horizontal-split simultaneous rightward type is specified as an output setting (NO in S500; NO in S508), the address generation unit 106 sets the read address pointer to the image at the starting address of the first line of the image (S516). That is, with the first video processing apparatus 101, arrows 1 in the subregions 708 and 709 of FIG. 7C are the lines set in S516. Also, with the second video processing apparatus 115, arrows 1 in the subregions 710 and 711 of FIG. 7C are the lines set in S516.

The RDMAC 107 reads one line of the image by referring to the read address pointer to the image (S517). When the line of the image has been read out, the address generation unit 106 sets the read address pointer to the image at the starting address of the next line (S518). That is, with the first video processing apparatus 101, arrows 2 in the subregions 708 and 709 of FIG. 7C are the lines set in S518. With the second video processing apparatus 115, arrows 2 in the subregions 710 and 711 of FIG. 7C are the lines set in S518. In this way, the RDMAC 107 continues reading lines alternately from the image until the entire image is completely read out (S519 and S517 to S518).

Referring back to FIG. 8, in the case of horizontal-split simultaneous rightward scanning, the image output unit 112 divides the line data (S815) and outputs the resulting data simultaneously through link 0 and link 1 (S816). An image output method used by the line generation unit 110, the horizontal synchronization signal generation unit 109, and the image output unit 112 in the case of the horizontal-split simultaneous rightward type will be described with reference to the flowchart of FIG. 6. When the horizontal-split simultaneous rightward type is specified as an output setting (NO in S600; NO in S609), the horizontal synchronization signal is not masked and lines are not horizontally flipped or combined. First, the line generation unit 110 receives a line of the upper image and the horizontal synchronization signal generation unit 109 receives the horizontal synchronization signal for the line (S616). The line generation unit 110 writes the received line data into the line buffer 111 (S617).

Figure 4B:
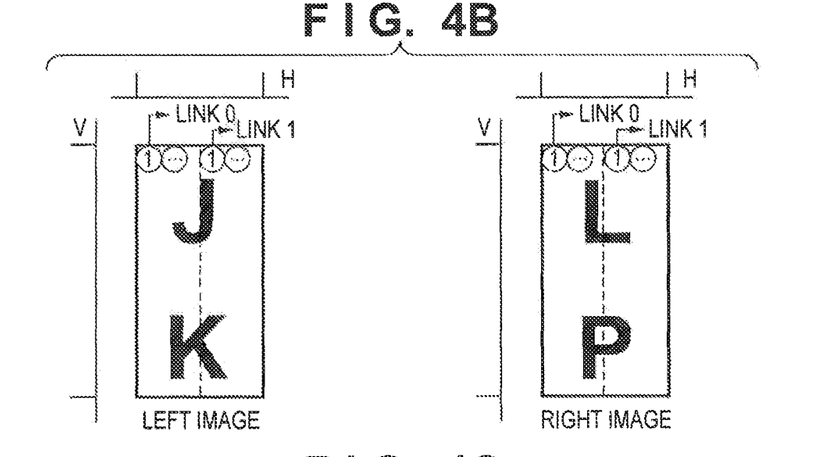
Figure 4C:
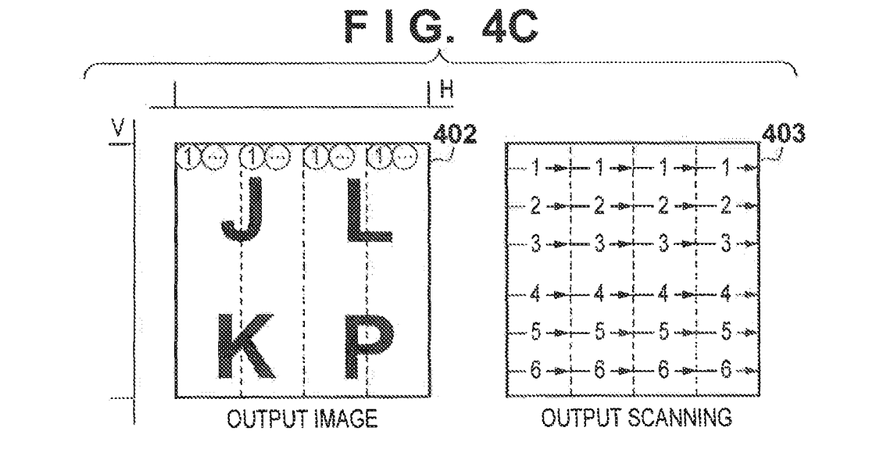

The image output unit 112 divides one line and outputs the line data from the line buffer 111 in dual-link mode (S618). In so doing, the dividing line is brought into coincidence with the dividing line which is output to the display panel in the case of horizontal-split simultaneous rightward scanning. That is, in the first video processing apparatus 101, the image output unit 112 sets the starting and ending pixels on link 0 at the starting and ending pixels of the line in the left subregion of an image of "JK." Also, the image output unit 112 sets the starting and ending pixels on link 1 at the starting and ending pixels of the line in the right subregion of the image of "JK." The left and right images at the time of output are shown in FIG. 4B. The circles and numbers in FIG. 4B represent pixels and their output order. The pixels in the left subregion of the image of "JK" and pixels in the right subregion of the image of "JK" are output simultaneously, through link 0 and link 1, respectively. The pixel data output from the image output unit 112 is combined by the display panel control unit 113 with the pixels from the other image processing apparatus and is output to the display panel (S817). The image which is output to the display panel is shown in FIG. 4C. The right and left image segments are combined and displayed as an image 402. The output scanning used at this time is horizontal-split simultaneous rightward scanning as shown in 403.

Note that although in the above embodiment, the input image is divided horizontally into two segments (left and right), the number of segments is not limited to two as long as the dividing line of display panel output matches the dividing line of the input image. Also, when the input image is divided along the dividing line of the display panel output, a peripheral pixel area during endpoint processing may be exchanged between the first video processing apparatus 101 and the second video processing apparatus 115. Also, although outputs are described as being produced in dual-link mode, this is not restrictive. Standards such as LVDS support simultaneous four-port outputs in quad-link mode.

With the video display apparatus according to the present embodiment, methods for vertical flipping during reading from the frame buffer 105, vertical flipping during writing into the line buffer 111, and simultaneous output from the line buffer 111 are changed according to output settings. This eliminates the needs for a frame buffer for output scan conversion and a plurality of output circuits, and thereby reduces the quantity of circuits. Also, a same configuration can be used for output scanning of any of the horizontal-split simultaneous rightward type, the horizontal-split simultaneous rightward type, and the cross-split simultaneous outward scanning type.

The present invention can also be implemented by executing the following process, that is, by software (a program) which implements the functions of the above embodiment if the software (program) is supplied to a system or an apparatus via a network or any of various storage media and a computer (or a CPU or an MPU) of the system or the apparatus then reads and executes the program.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-078987, filed Apr. 4, 2013 which is hereby incorporated by reference herein in its entirety.

What is claimed is:

1. An image processing apparatus which supplies an image to a display apparatus configured to create a display in an output scanning mode in which drawing scans are performed at a scanning order different from an input order of the image in parallel in a plurality of subregions making up one screen, the image processing apparatus comprising:

a plurality of image processing units configured to execute image processing in parallel, wherein each of the plurality of image processing units includes:

a receiving unit configured to receive a partial image which is obtained by dividing the image and store the partial image into a frame buffer;

a reading unit configured to read the partial image from the frame buffer in line order corresponding to the output scanning mode;

a processing unit configured to execute image processing on the partial image read by the reading unit;

a writing unit configured to write the processed partial image on which the image processing is executed by the processing unit into a line buffer in pixel order corresponding to the output scanning mode; and an output unit configured to output a plurality of lines of the processed partial image in parallel during one scanning interval of the output scanning mode.

2. The image processing apparatus according to claim 1, wherein:

the plurality of image processing units respectively process a left partial image and a right partial image obtained by dividing the image;

the reading unit divides each of the partial images held in the frame buffer to obtain an upper image and a lower image and reads line data of the upper image and the lower image alternately; and the writing unit writes line data of the upper image and line data of the lower image on which the image processing is executed into the line buffer.

3. The image processing apparatus according to claim 2, wherein:

the reading unit reads the line data of the upper image from bottom to top and reads the line data of the lower image from top to bottom; and the writing unit reverses both of the line data of the upper image and the line data of the lower image and writes the reversed line data into the line buffer.

4. The image processing apparatus according to claim 2, wherein the reading unit reads the line data of the upper image from top to bottom and reads the line data of the lower image from top to bottom.

5. The image processing apparatus according to claim 1, wherein:

the plurality of image processing units respectively process a left partial image and a right partial image obtained by dividing the image;

the reading unit reads line data of the left and right partial images held in the frame buffer from top to bottom; and the output unit outputs the line data in parallel after the line data is divided into a plurality of items of line data.

6. The image processing apparatus according to claim 1, further comprising a generation unit configured to generate a horizontal synchronization signal such that one item of line data written into the line buffer by the writing unit will be assigned to one scanning interval of the output scanning mode.

7. The image processing apparatus according to claim 1, wherein the output unit produces in parallel outputs in a dual-link mode.

8. The image processing apparatus according to claim 1, further comprising a designation unit used to specify one output scanning mode out of a plurality of output scanning modes, wherein the line order as well as the pixel order are changed according to the output scanning mode specified via the designation unit.

9. The image processing apparatus according to claim 1, wherein the plurality of image processing units save partial images in the frame buffer after applying image processing to the partial images.

10. A control method for an image processing apparatus which includes a plurality of image processing units and supplies an image to a display apparatus configured to create a display in an output scanning mode in which drawing scans are performed at a scanning order different from an input order of the image in parallel in a plurality of subregions making up one screen, the control method comprising for each of the plurality of image processing units:

receiving a partial image which is obtained by dividing the image and storing the partial image into a frame buffer;

reading the partial image in line order corresponding to the output scanning mode from the frame buffer;

executing image processing on the partial image read;

writing the processed partial image on which the image processing is executed into a line buffer in pixel order corresponding to the output scanning mode; and outputting a plurality of lines of the processed partial image in parallel during one scanning interval of the output scanning mode.

11. A non-transitory computer readable storage medium storing a program causing a computer to perform a control method for an image processing apparatus which includes a plurality of image processing units and supplies an image to a display apparatus configured to create a display in an output scanning mode in which drawing scans are performed at a scanning order different from an input order of the image in parallel in a plurality of subregions making up one screen, the control method comprising for each of the plurality of image processing units:

receiving a partial image which is obtained by dividing the image and storing the partial image into a frame buffer;

reading the partial image in line order corresponding to the output scanning mode from the frame buffer;

executing image processing on the partial image read;

writing the processed partial image on which the image processing is executed into a line buffer in pixel order corresponding to the output scanning mode; and outputting a plurality of lines of the processed partial image in parallel during one scanning interval of the output scanning mode.

* * * * *